Figure 1:
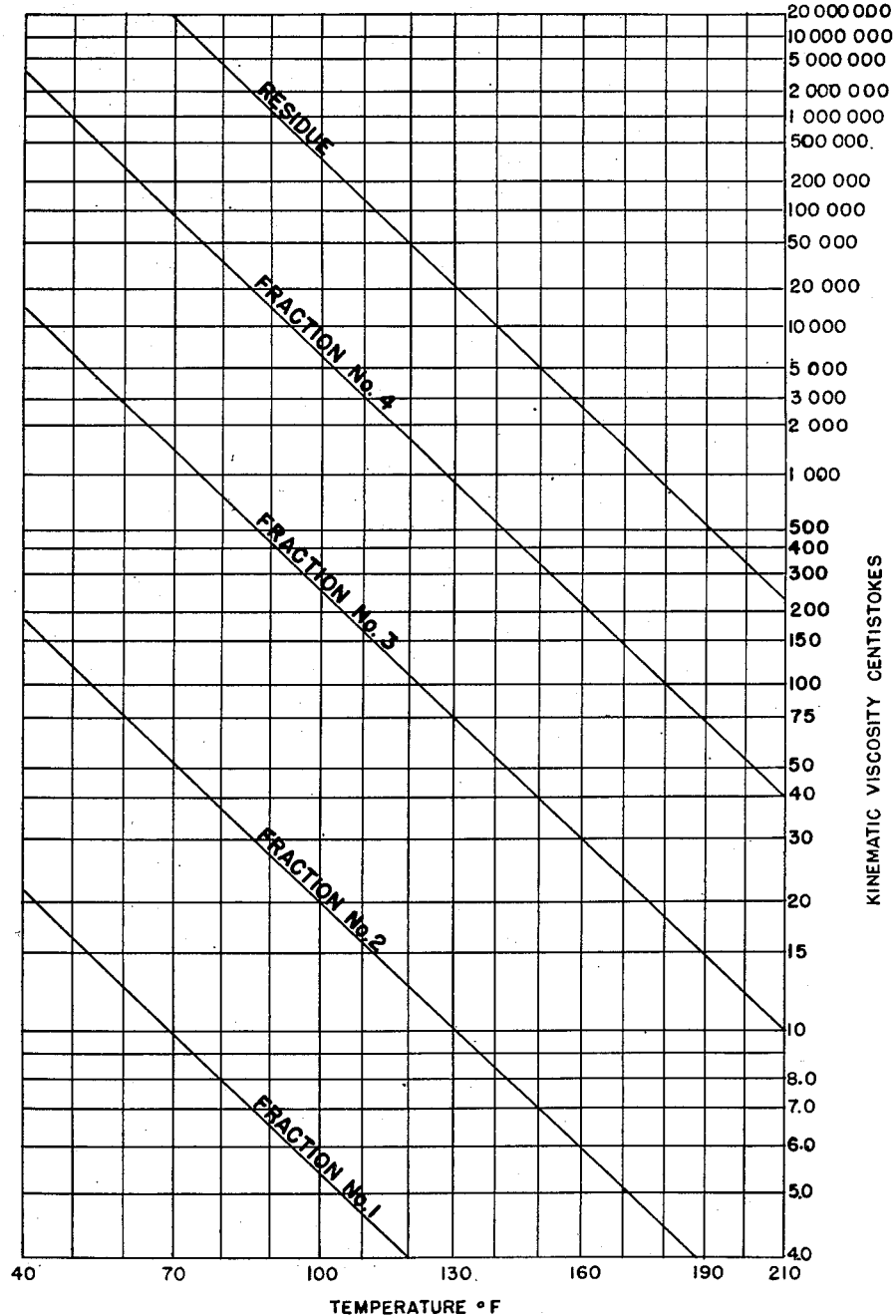

United States Patent Office 2,706,715
Patented Apr. 19, 1955

2,706,715
GREASE COMPOSITION

Rex C. Conner, Englewood, N. J., assignor to The M. W. Kellogg Company, Jersey City, N. J., a corporation of Delaware Application March 28, 1950, Serial No. 152,351

14 Claims. (Cl. 252—13)

This invention relates to a grease composition. In one aspect the invention relates to a composition characteristic of grease composed of perhalogenated compounds. In another aspect this invention relates to a composition suitable for impregnation of articles of manufacture. Various grease compositions are known in the art. These compositions, however, for the most part are unsuitable to acids, oxygen compounds and other corrosive materials. It is an object of the invention to provide a grease composition which is chemically and physically stable and useful over a relatively wide temperature range and having relatively low friction properties.

The grease composition of this invention comprises a mixture of trifluorochloroethylene polymers. Particularly, the grease composition is composed of a normally liquid polymer of trifluorochloroethylene and a high melting point waxy polymer of trifluorochloroethylene. The normally liquid component of the grease boils within the range between about 150° F. and about 450° F. at one millimeter of mercury absolute pressure. The high melting point waxy component of the grease melts at a temperature above about 350° F., preferably between 380° F. and 410° F.

The grease composition of this invention contains between about 3 and about 25 weight per cent of the wax component, preferably between about 6 and about 16 weight per cent of the wax component. The grease composition is prepared by admixing the oil and wax components of the grease in a mixing vessel and stirring gently. The mixture is heated to a sufficiently high temperature to form a homogeneous mixture with continued stirring. While continuing stirring, the temperature is raised to the boiling point of the mixture and, thereafter, the material is poured into a container and cooled to about room temperature to solidify the grease.

The finished grease is a white, wax-like material having a relatively low coefficient of friction and resembles tallow in appearance. The melting point of the grease will depend upon the physical properties of the components and the ratio of oil to wax in the grease. Generally, the melting point of the grease is above about 150° F.

It is believed that the wax component of the grease sorbs the liquid component thus retaining the body characteristic of the wax. At least 3 weight per cent of the wax component is necessary to obtain a sufficiently firm body in order that the grease will retain its shape. More than 25 weight per cent of the wax component results in cracking and shrinkage of the grease and, in general, causes the resulting product to have inferior qualities.

The oil and wax components of the grease are obtained by the polymerization of trifluorochloroethylene, a perhalogenated olefin. The preferred method of preparing the oil component of the grease is by the polymerization of trifluorochloroethylene at a temperature between about 150° F. and about 400° F. in the presence of a chain transfer solvent, such as chloroform, and a promotor, such as benzoyl peroxide. The polymerization product obtained by such polymerization is an oily substance containing oils, greases and relatively low melting waxes. This crude polymer is subjected to cracking at a temperature between about 650° F. and about 750° F. The product of the cracking operation is then preferably subjected to stabilization by reaction with chlorine trifluoride and subsequently with cobalt trifluoride. The stabilized cracked oil is fractionated into various fractions by distillation under subatmospheric pressure.

In a preferred embodiment of this invention, the fluorinated oil obtained in the above manner is distilled to obtain five fractions. The first fraction is a light oil distilling at a temperature between about 200° F. and about 230° F. at one millimeter of mercury absolute pressure. This first fraction has a specific gravity at 68° F. of about 1.91 and a kinematic viscosity at 210° F. of about 1.5 centistokes. The second fraction is a medium oil distilling at a temperature between about 230° F. and about 285° F. at one millimeter of mercury absolute pressure. This second fraction has a specific gravity at 68° F. of about 1.93 and a kinematic viscosity at 210° F. of about 3 centistokes. The third fraction is a heavy oil distilling at a temperature between about 285° F. and about 375° F. at one millimeter of mercury absolute pressure. This third fraction has a specific gravity at 68° F. of about 1.97 and a kinematic viscosity at 210° F. of about 10 centistokes. The fourth fraction is an oil containing sufficient wax to give this fraction a pour point of about 80° F. to 90° F. This fourth fraction distills at a temperature between about 375° F. and about 450° F. at one millimeter of mercury absolute pressure and has a specific gravity at 68° F. of about 1.99 and a kinematic viscosity at 210° F. of about 40 centistokes. The fifth fraction is a relatively hard wax at room temperature distilling at a temperature above about 450° F. at one millimeter of mercury absolute pressure. This wax has a melting point of about 160° F. The wax has a specific gravity at 68° F. of about 2.02 and a kinematic viscosity at 210° F. of about 250 centistokes. This fifth or wax fraction is the residue obtained from the distillation of the fluorinated oil prepared in the above manner. Because of its low melting point, this wax fraction or residue does not correspond to the wax component of the grease which wax component and its preparation will be described more fully hereinafter. The extreme limits of the boiling ranges of the various liquid fractions may vary as much as 10° F. to 20° F. and the boiling ranges of the fractions may overlap to some extent without departing from the scope of this invention.

Figure 2:
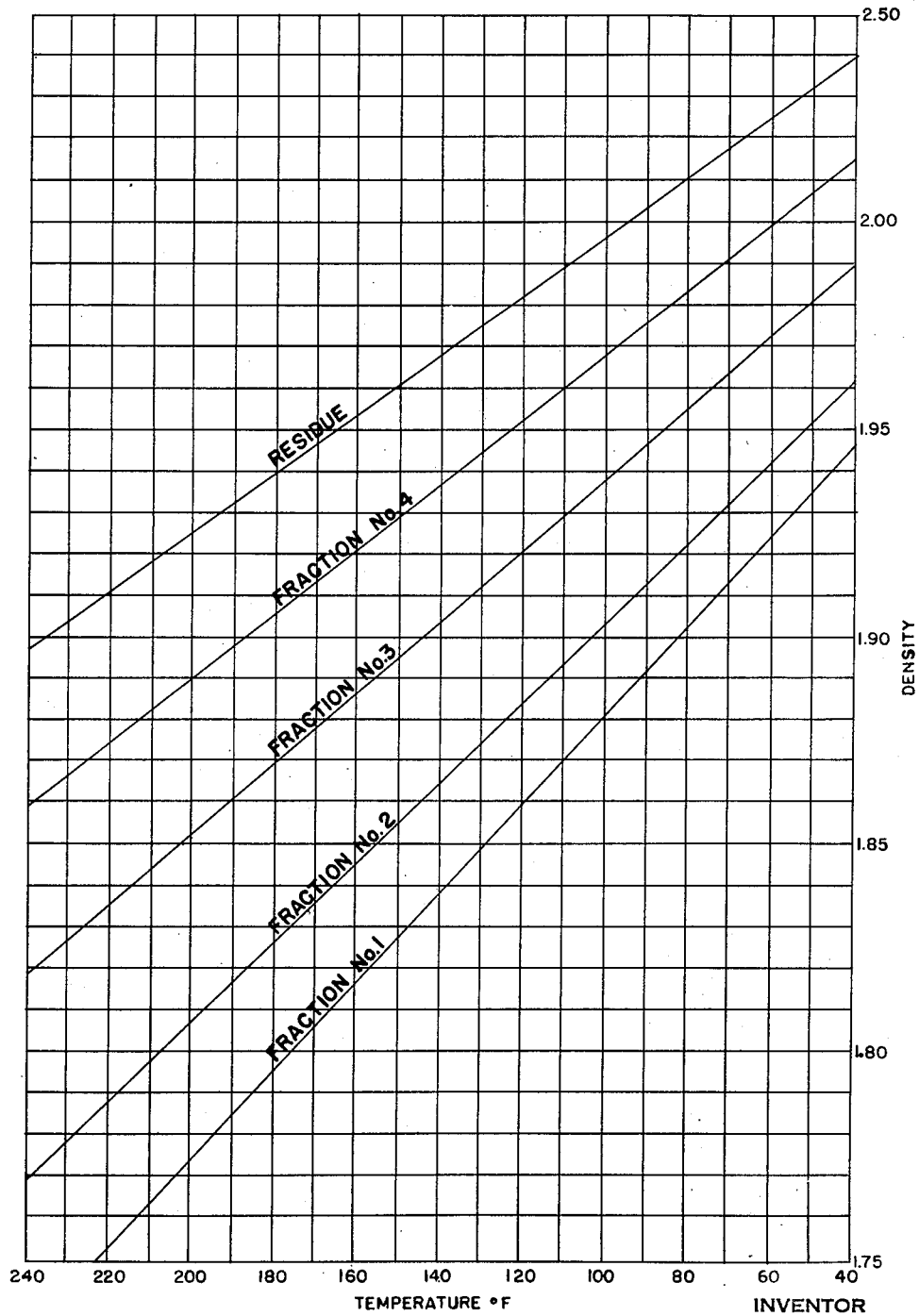

Figure 1 of the drawings is a graph of the kinematic viscosity versus temperature for the five fractions above described, which fractions are obtained by fractional distillation of the fluorinated oil. The graph shows the change in viscosity with temperature for the various fractions and, also, shows the difference in viscosity between the various fractions themselves. Figure 2, of the drawings, is a graph of density versus temperature for the various oil fractions previously described. The graph of Figure 2 shows the relationship of density to temperature and the relationship of density between the various fractions themselves.

The wax component of the grease composition of the present invention is prepared by emulsion or dispersion polymerization of trifluorochloroethylene in an aqueous solution of ammonium or potassium persulphate at a temperature between about 140° F. and about 200° F. and autogenous pressure. The preferred ratio of water to monomer is about six to one. The amount of ammonium, or potassium persulphate, based on monomer, is about 3 weight per cent. Preferably, an activator, such as sodium bi-sulphite is employed in equimolar quantities with the persulphate. After about thirty hours of residence time the polymer is separated from the emulsion or dispersion by filtering, followed by drying. This polymer, thus separated, is a hard wax, having a melting point of about 385° F. and may be used, without further treatment, as the wax component of the grease composition of this invention.

Various combinations of the oil fractions and the wax component may be employed as the final grease composition of this invention. In any case, the wax component of the grease is within the limits of about 3 to about 25 weight per cent. Any one of the oil fractions may be combined with the wax component to make up the final grease composition. Several, or all, of the oil fractions may be combined together with the wax component to make up the final grease composition without departing from the scope of this invention. The residue, or wax fraction, obtained by the distillation of the fluorinated oil may, also, be included as a third component of the grease. The oil fractions boiling below about 375° F. at one millimeter of mercury absolute pressure when combined with the wax component make an ideal high speed, low film strength grease. Those oil fractions boiling above about 375° F. at one millimeter of mercury absolute pressure when combined with the wax component, in accordance with this invention, make an ideal low speed, high pressure grease. These low speed, high pressure greases have relatively high film strength. The use of the residue, or wax fraction, obtained by the distillation of the fluorinated oil increases the film strength of the grease and generally makes the grease composition more suitable for low speed, high pressure work.

The following examples are offered, as an illustration of the invention, showing the composition and characteristic of the grease obtained according to this invention. The examples are merely illustrative and should not be considered unnecessarily limiting to the invention.

*Example I*

A polytrifluorochloroethylene oil of the characteristic and properties of the second fraction, previously described, was admixed with a high melting point, polytrifluorochloroethylene wax melting at a temperature of about 385° F., in an amount sufficient to render the final composition 88 per cent by weight of oil and 12 per cent by weight of high melting point wax. The above mixture was heated to a temperature of about 340° F. with gentle agitation. The temperature was raised slowly to the boiling point. When the boiling point was reached, the homogeneous mixture was poured into a container and cooled to room temperature to solidify the grease. The resulting grease was a white, soft, wax-like grease, resembling tallow in appearance and properties. The grease had a melting point of approximately 230° F. and a boiling point of approximately 390° F. The grease was not brittle at a temperature of −110° F.

*Example II*

An oil of the characteristic and properties of the second fraction previously described and a residue of the nature of the residue fraction previously described was admixed with a high melting point polytrifluorochloroethylene wax, melting at a temperature of about 385° F., in amounts sufficient to render the final composition about 75 per cent of oil, 10 per cent of residue or low melting point wax and 15 per cent of high melting point wax. The method of preparing a grease of the above composition constituted admixing the oil and the low melting point wax or residue in a vessel and heating the mixture to a temperature of about 230° F. with gentle agitation. At this point, the high melting point wax was added with agitation and the resulting mixture heated to 400° F. When the mixture became clear at this temperature, it was poured into a container and cooled to room temperature. The finished grease was a white, wax-like grease, having a melting point of about 300° F. and a boiling point of about 400° F. The solidification point of the grease was about 252° F. and the temperature necessary for impregnating fibrous material was about 360° F. This grease was a suitable high pressure, low speed grease.

The grease of this invention constitutes a superior material for pump and valve stem packings on all inorganic aqueous systems including acids, caustics and salts. The grease, however, is not recommended for some organic systems because of the solvent action of the organic compounds in contact with the grease. The grease, such as that of Example I, can be impregnated in dry braided asbestos or other fibrous packing materials for use as packing glands, rings and bushings. In incorporating such a grease with fibrous packing materials, such as braided asbestos, the substances including the grease are separately heated to a temperature above its melting point, for example about 270° F., thereafter the packing material, such as asbestos, is immersed in the molten grease, removed and cooled to room temperature. Appearance of the impregnated asbestos or packing material will depend on the cleanliness of the operation. The polytrifluorochloroethylene grease provides adequate protection for the packing material, such as asbestos, and it is possible to substitute, for example, white asbestos for the commonly used abrasive blue asbestos.

Polytrifluorochloroethylene grease as a packing impregnant may replace paraffin wax, hydrocarbon greases and oils, tallow, Japan wax, palmoil and other common lubricants and greases now sold under the trade name of "acid packings." Many other applications of the grease are possible, such as in the field of oxygen manufacture, food processings and pharmaceuticals, where a grease or impregnating packing material of non-corrosive and non-reactive nature is required.

I claim:

1. A grease composition comprising a homogeneous admixture of a normally liquid polymer of trifluorochloroethylene boiling within the range of about 150° F. and about 450° F. at 1 millimeter of mercury absolute pressure, and a relatively high melting point waxy polymer of trifluorochloroethylene melting at a temperature above about 350 F., said grease composition having a melting point of approximately 230° F. and a boiling point of approximately 390° F.

2. A grease composition which comprises a homogeneous admixture of a normally liquid polymer of trifluorochloroethylene boiling within the range of about 150° F. and about 450° F. at 1 millimeter of mercury absolute pressure, and between about 3 and about 25 weight per cent of a relatively high melting point waxy polymer of trifluorochloroethylene melting at a temperature above about 350° F.

3. A grease composition having the appearance of a white, wax-like material, of relatively low friction properties and resembling tallow and having a melting point above about 150° F. which comprises a homogeneous admixture of a normally liquid polymer of trifluorochloroethylene boiling within the range between about 150° F. and 450° F. at 1 millimeter of mercury absolute pressure, and between about 6 and about 16 weight per cent of a relatively high melting point waxy polymer of trifluorochloroethylene having a melting point between about 380° F. and about 410° F.

4. A grease composition which comprises a homogeneous admixture of a normally liquid fraction of polytrifluorochloroethylene distilling at a temperature between about 230° F. and about 285° F. at 1 millimeter of mercury absolute pressure and having a specific gravity at 68° F. of about 1.93 and a kinematic viscosity at 210° F. of about 3 centistokes, and between about 6 and about 16 weight per cent of a relatively high melting point waxy polymer of trifluorochlorethylene melting at a temperature between about 380° F. and about 410° F.

5. A high pressure, low speed grease composition consisting essentially of a homogeneous admixture of a normally liquid fraction of polytrifluorochloroethylene distilling at a temperature between about 230° F. and about 285° F. at 1 millimeter of mercury absolute pressure and having a specific gravity at 68° F. of about 1.93 and a kinematic viscosity at 210° F. of about 3 centistokes, a low melting point waxy fraction of polytrifluorochloroethylene distilling at a temperature above about 450° F. at 1 millimeter of mercury and having a melting point of about 160° F. and a specific gravity at 68° F. of about 2.02 and a kinematic viscosity at 210° F. of about 250 centistokes, and between about 6 and about 16 weight per cent of a relatively high melting point waxy polymer of trifluorochloroethylene melting at a temperature between about 380° F. and about 410° F.

6. A grease composition which comprises a homogeneous admixture of a normally liquid fraction of polytrifluorochloroethylene distilling at a temperature between about 200° F. and about 230° F. at 1 millimeter of mercury absolute pressure and having a specific gravity at 68° F. of about 1.91 and a kinematic viscosity at 210° F. of about 1.5 centistokes, and between about 3 and about 25 weight per cent of a relatively high melting point waxy polymer of trifluorochloroethylene melting at a temperature between about 380° F. and about 410° F.

7. A grease composition which comprises a homogeneous admixture of a normally liquid fraction of polytrifluorochloroethylene distilling at a temperature between about 285° F. and about 375° F. at 1 millimeter of mercury absolute pressure and having a specific gravity at 68° F. of about 1.97 and a kinematic viscosity at 210° F. of about 10 centistokes, and between about 3 and about 25 weight per cent of a relatively high melting point waxy polymer of trifluorochloroethylene melting at a temperature between about 380° F. and about 410° F.

8. A grease composition which comprises a homogeneous admixture of a normally liquid fraction of polytrifluorochloroethylene distilling at a temperature between about 375° F. and about 450° F. at 1 millimeter of mercury absolute pressure and having a specific gravity at 68° F. of about 1.99 and a kinematic viscosity at 210° F. of about 40 centistokes, and between about 3 and about 25 weight per cent of a relatively high melting point waxy polymer of trifluorochloroethylene melting at a temperature between about 380° F. and about 410° F.

9. A composition of matter comprising asbestos impregnated with a grease comprising a normally liquid polymer of trifluorochloroethylene boiling within the range between about 150° F. and about 450° F. at 1 millimeter of mercury absolute pressure and between about 3 and about 25 weight per cent of a relatively high melting point waxy polymer of trifluorochloroethylene melting at a temperature above about 350° F.

10. A packing material, which comprises asbestos impregnated with a grease comprising a normally liquid fraction of polytrifluorochloroethylene distilling at a temperature between about 230° F. and about 285° F. at 1 millimeter of mercury absolute pressure and between about 6 and about 16 weight per cent of a relatively high melting point waxy polymer of trifluorochloroethylene melting at a temperature between about 380° F. and about 410° F.

11. A grease composition comprising a homogeneous admixture of a normally liquid polymer of trifluorochloroethylene boiling within the range of about 150° F. and about 450° F. at 1 millimeter of mercury absolute pressure and a relatively high melting point waxy polymer of trifluorochloroethylene melting at a temperature above about 350° F., the normally liquid polymer of trifluorochloroethylene having been prepared by polymerizing trifluorochloroethylene at a temperature between about 150° F. and about 400° F. in the presence of benzoyl peroxide as the promoter and the relatively high melting point waxy polymer of trifluorochloroethylene having been prepared by polymerizing trifluorochloroethylene at a temperature between about 140° F. and about 200° F. in the presence of an aqueous solution of a persulfate as the promoter.

12. A method of preparing a grease composition comprising admixing a normally liquid fraction of polytrifluorochloroethylene boiling within the range of about 150° F. and about 450° F. at 1 millimeter of mercury absolute pressure with between about 3 and about 25 weight per cent of a hard waxy fraction of polytrifluorochloroethylene melting at a temperature above about 350° F., heating the admixture with continuous stirring until the boiling point of the mixture is reached and thereafter cooling the mixture to room temperature to solidify the grease.

13. A method of preparing a grease composition comprising admixing a normally liquid polymer of trifluorochloroethylene boiling within the range of about 150° F. and about 450° F. at 1 millimeter of mercury absolute pressure and a relatively high melting point waxy polymer of trifluorochloroethylene melting at a temperature above about 350° F., the normally liquid polymer of trifluorochloroethylene having been prepared by polymerizing trifluorochloroethylene at a temperature between about 150° F. and about 400° F. in the presence of benzoyl peroxide as the promoter and the relatively high melting point waxy polymer of trifluorochloroethylene having been prepared by polymerizing trifluorochloroethylene at a temperature between about 140° F. and about 200° F. in the presence of an aqueous solution of a persulfate as the promoter, heating the admixture with continuous stirring until the boiling point of the mixture is reached and thereafter cooling the mixture to room temperature to solidify the grease.

14. A grease composition comprising a homogeneous admixture of a normally liquid polymer of trifluorochloroethylene boiling within the range of about 150° F. and about 450° F. at 1 millimeter of mercury absolute pressure, and a relatively high melting point waxy polymer of trifluorochloroethylene melting at a temperature above about 350° F., said grease composition having a melting point of about 300° F. and a boiling point of about 400° F.

References Cited in the file of this patent

UNITED STATES PATENTS

| | | |
|---|---|---|
| 2,318,684 | Gaylor | May 11, 1943 |
| 2,449,689 | Carnell | Sept. 21, 1948 |

FOREIGN PATENTS

| | | |
|---|---|---|
| 465,520 | Great Britain | May 3, 1937 |
| 634,673 | Great Britain | Mar. 22, 1950 |

OTHER REFERENCES

Industrial and Engineering Chemistry, vol. 39, No. 3, pages 333–337.